United States Patent [19]

Barnert et al.

[11] 4,164,457

[45] Aug. 14, 1979

[54] METHOD OF RECOVERING HYDROGEN AND OXYGEN FROM WATER

[75] Inventors: Heiko Barnert; Mieczyslaw Perec, both of Jülich; Bernd D. Struck, Langerwehe, all of Fed. Rep. of Germany

[73] Assignee: Kernforschungsanlage Jülich Gesellschaft mit beschränkter Haftung, Jülich, Fed. Rep. of Germany

[21] Appl. No.: 917,842

[22] Filed: Jun. 22, 1978

[30] Foreign Application Priority Data

Jun. 23, 1977 [DE] Fed. Rep. of Germany ....... 2728171

[51] Int. Cl.$^2$ .................. C25B 1/04; C01B 13/00
[52] U.S. Cl. ................................ 204/129; 423/579
[58] Field of Search ................... 423/579; 204/129

[56] References Cited

U.S. PATENT DOCUMENTS

| | | | |
|---|---|---|---|
| 3,888,750 | 6/1975 | Brecher et al. | 204/129 |
| 4,080,436 | 3/1978 | Fremery et al. | 204/129 |

*Primary Examiner*—R. L. Andrews
*Attorney, Agent, or Firm*—Becker & Becker, Inc.

[57] ABSTRACT

A method of recovering hydrogen and oxygen from water. Water and sulfur dioxide are supplied to, and hydrogen and sulfuric acid are removed from, a galvanic or electrolytic cell. Hydrogen ions are electrochemically liberated by anodic oxidation of the supplied sulfur dioxide accompanied by decomposition of the water and formation of sulfuric acid in the anolyte, and hydrogen gas is electrolytically generated at the cathode from the hydrogen ions. To evaporate water, electrolytic solution is removed from the anode chamber of the galvanic cell. The anode chamber is separated from the cathode chamber by means of a membrane. After the ensuing evaporation, the thus formed anhydride of the sulfuric acid is decomposed by being heated, and is accompanied by the formation of oxygen and sulfur dioxide gas. The sulfur dioxide is oxidized at a carbon and/or graphite anode in the presence of very small quantities, e.g. a minimum of 0.005% by weight, of hydriodic acid in the anolyte. The hydriodic acid which is found in that portion of the electrolyte which is removed from the anode chamber is evaporated together with the water. The evaporated water, together with the evaporated hydriodic acid, are again supplied to the anode chamber.

4 Claims, No Drawings

METHOD OF RECOVERING HYDROGEN AND OXYGEN FROM WATER

The present invention relates to a method of recovering hydrogen and oxygen from water, according to which water and sulfur dioxide are supplied to, and hydrogen and sulfuric acid are removed from, a galvanic or electrolytic cell. In this connection, hydrogen ions are electrochemically liberated by anodic oxidation of the supplied sulfur dioxide accompanied by decomposition of the water and formation of sulfuric acid in the anolyte, and hydrogen gas is electrolytically generated at the cathode from the hydrogen ions. To evaporate water, electrolytic solution is removed from the anode chamber of the galvanic cell. The anode chamber is separated from the cathode chamber by means of a membrane. After the ensuing evaporation, the thus formed anhydride of the sulfuric acid is decomposed by being heated, and is accompanied by the formation of oxygen and sulfur dioxide gas.

Hydrogen is utilized as a secondary energy carrier and as chemical raw material in many ways. Of particular significance in this connection is the recovery of hydrogen from water with the use of thermal energy. The thermal energy can be supplied by, for example, a nuclear reactor.

A method of the above mentioned general type, also known as sulfuric acid-hybrid-process, is taught by U.S. Pat. No. 3,888,750. Assuming that the electrochemical step of this method could be carried out with a cell voltage of several tenths of a volt, the known method could be practiced in an economical manner. However, pursuant to the description in the above mentioned patent, several factors necessary for carrying out the known method are not clear. For example, of what materials should the electrodes consist, or what measures should be taken in order to keep the electrical energy consumption as low as possible. S. J. Warde and L. E. Brecher, in a report entitled "High-Efficiency Cell for Hydrogen Production", submitted for publication to the "International Journal of Hydrogen Energy", indicate that the electrodes for carrying out the electrochemical step of the known sulfuric acid-hybrid-process consist of platinum grids upon which platinum is plated by electro deposition at the start of every experiment. However, such electrodes cannot be used for a large industrial realization of the sulfuric acid-hybrid-process, since the use of platinum in this or any other form is not economically acceptable.

It is therefore an object of the present invention, starting with the heretofore known method, to provide a method of recovering hydrogen and oxygen from water, according to which the electrochemical step, and thereby the entire method, can be carried out in an economical manner even with a large industrial use of the method.

Pursuant to the present invention, the method of the above described general type is characterized primarily in that the sulfur dioxide is oxidized at a carbon and/or graphite anode in the presence of very small quantities of hydriodic acid in the anolyte, i.e. in the electrolyte found in the anode chamber. The present invention is further characterized in that the hydriodic acid which is found in that portion of the electrolyte which is removed from the anode chamber is evaporated together with the water. The evaporated water, together with the evaporated hydriodic acid, are again supplied to the anode chamber. The use of hydriodic acid as homogeneous catalyst for the anodic oxidation of sulfur dioxide has already been considered for high concentrations of hydriodic acid in the anolyte, for example, 2.0 Mol/l. Even if the higher hydriodic acid concentration leads to an increase in the effectiveness of the electrolysis step, the use of hydriodic acid as catalyst was not considered practical for the reason that the presence of $H_2SO_3$ and $H_2SO_4$ lead to a formation of $I_2$ and S from the hydriodic acid.

German Offenlegungsschrift No. 2,542,935 also teaches the use of hydriodic acid as catalyst. However, with this known method the use of hydriodic acid as catalyst is provided in combination with a platinized graphite anode, which, for the previously mentioned reasons, does not make this method of recovering hydrogen and oxygen possible for large industrial uses.

In contrast, the present invention proceeds from the surprising discovery that already a very small quantity of hydriodic acid in the anolyte, and an anode of carbon and/or graphite, form a homogeneous-heterogeneous catalyst, the use of which leads to a productivity of the electrochemical step which is four times greater than the productivity achieved with the use of a hydriodic catalyst and a platinized graphite anode. For practicing the method of the present invention, the concentration of hydriodic acid in the electrolyte is such that iodine formed in the electrolyte or on the anode, without concentration, again goes directly into solution as hydriodic acid by means of chemical reaction with sulfur dioxide and water. The minimum concentration of hydriodic acid in the anolyte is 0.005% by weight. Even at concentrations of about 25% by weight of sulfuric acid, the quantities of hydriodic acid are very small.

When practicing the method pursuant to the present invention, the hydriodic acid is expediently supplied to the anolyte through a separate device or through the electrolyte recovery device of the anolyte, for example as aqueous solution. The hydriodic acid exists in the anolyte as a solute. To adjust the concentration of the supplied hydriodic acid in the solution, while taking into consideration the above mentioned concentrations of hydriodic acid in the electrolyte, the minimization of the cost of the method is of course also a determining factor. Under this prerequisite, the recovery of hydrogen and oxygen can be carried out under economical conditions, since the consumption of electrical energy is relatively small and the manufacture of the anode only gives rise to low costs as a result of the cheap availability of the anode material. Moreover, the anode is easily and cheaply replaced.

The hydriodic acid contained in that portion of the electrolytic solution removed from the anode chamber, in the subsequent step of evaporating water, is similarly evaporated with the water in the presence of sulfur dioxide until it is separated from the sulfuric acid except for traces of the latter. A very expedient step consists in removing the electrolytic solution, and in particular evaporating the water and hydriodic acid, while supplying sulfur dioxide, since this step guarantees that no solid iodine is formed prior to or during the evaporation. The supply of sulfur dioxide can be supplied either as sulfur dioxide gas into the gas phase found above the electrolytic solution, or can be conveyed directly into the electrolytic solution, thereby rinsing the latter.

The evaporated water, together with the evaporated hydriodic acid, in the presence of sulfur dioxide, are resupplied to the electrochemical step. The traces of hydriodic acid remaining in the sulfuric acid pass through the high temperature step of the method and return to the electrochemical step as constituents of the resupplied sulfur dioxide and other streams. The small traces of hydriodic acid remaining in the sulfuric acid do not adversely affect the catalytic action of the catalyst for the decomposition of the sulfur trioxide into sulfur dioxide and oxygen. The formation of sulfuric acid from iodine and sulfur dioxide as a side reaction, with preceding formal decomposition of hydriodic acid, is negligible due to the small concentration of hydriodic acid.

EXAMPLE

To carry out the electrochemical step, a graphite anode and an electrolytic solution of aqueous sulfuric acid of 50% by weight were used. The sulfuric acid was saturated with sulfur dioxide, and contained 0.005% by weight hydriodic acid. The temperature was 50° C., and the total pressure was 1 bar. The electrolyte was stirred. At a potential difference of 0.6 Volts compared with the equilibrium potential of the reversible hydrogen electrode in the same solution, a current density of 100 mA/cm$^2$ was obtained.

For comparison, a platinized graphite anode was introduced under otherwise the same conditions, and a current density of only 25 mA/cm$^2$ was obtained. For further comparison, the same electrolytic solution, however without the addition of hydriodic acid, and selectively a graphite anode and a platinized graphite anode, were used. During the use of the graphite anode, only a negligible reaction of sulfur dioxide was observed. The current density on the platinized graphite was about 20 mA/cm$^2$.

To carry out the step of evaporating water and hydriodic acid from the electrolytic solution, aqueous sulfuric acid having a concentration of 50% by weight at room temperature and atmospheric pressure were saturated with sulfur dioxide, and were subsequently mixed with 0.05% by weight of hydriodic acid. The solution was then brought to boiling at a total pressure of 1 bar under a sulfur dioxide atmosphere at about 120° C., and the vapor was condensed at room temperature and likewise at 1 bar in the presence of sulfur dioxide. The boiling temperature in the distilling flask increased with an increase in the concentration of sulfuric acid. At a boiling temperature of about 170° C., the concentration of sulfuric acid in the distilling flask was about 70% by weight, while the concentration of hydriodic acid in the distilling flask remained below the detection level for the customary measuring of iodine. In the condenser, the concentration of sulfuric acid was 3% by weight, and the concentration of hydriodic acid was about 0.15% by weight.

The present invention is, of course, in no way limited to the specific disclosure of the specification, but also encompasses any modifications within the scope of the appended claims.

What we claim is:

1. A method of recovering hydrogen and oxygen from water in a galvanic or electrolytic cell having an anode, made of a material selected from the group consisting of carbon and graphite, and a cathode, said anode and said cathode being separated from one another by a membrane to form an anode and cathode chamber respectively, which method includes the steps of:
    adding water, sulfur dioxide, and very small quantities of hydriodic acid to said anode chamber of said cell;
    electrochemically liberating hydrogen ions by anodic oxidation of said sulfur dioxide in the anolyte;
    decomposing said water to form sulfuric acid in said anolyte;
    electrolytically generating hydrogen gas at the cathode from said hydrogen ions;
    removing electrolytic solution from said anode chamber;
    evaporating water and hydriodic acid still present in said removed electrolytic solution to form an anhydride of said sulfuric acid;
    heating said sulfuric acid anhydride to decompose same; and
    returning said evaporated water and hydriodic acid to said anode chamber.

2. A method according to claim 1, which includes the step of setting the concentration of hydriodic acid in the electrolyte in such a way that iodine formed in said anode chamber, without concentration, goes directly into solution as hydriodic acid by means of chemical reaction with said sulfur dioxide and said water, the minimum concentration of hydriodic acid in the anolyte being 0.005% by weight.

3. A method according to claim 1, which includes the step of adding sulfur dioxide during the step of removing electrolytic solution.

4. A method according to claim 3, which includes the step of adding sulfur dioxide during the step of evaporating water and hydriodic acid.

* * * * *